Figure 1:
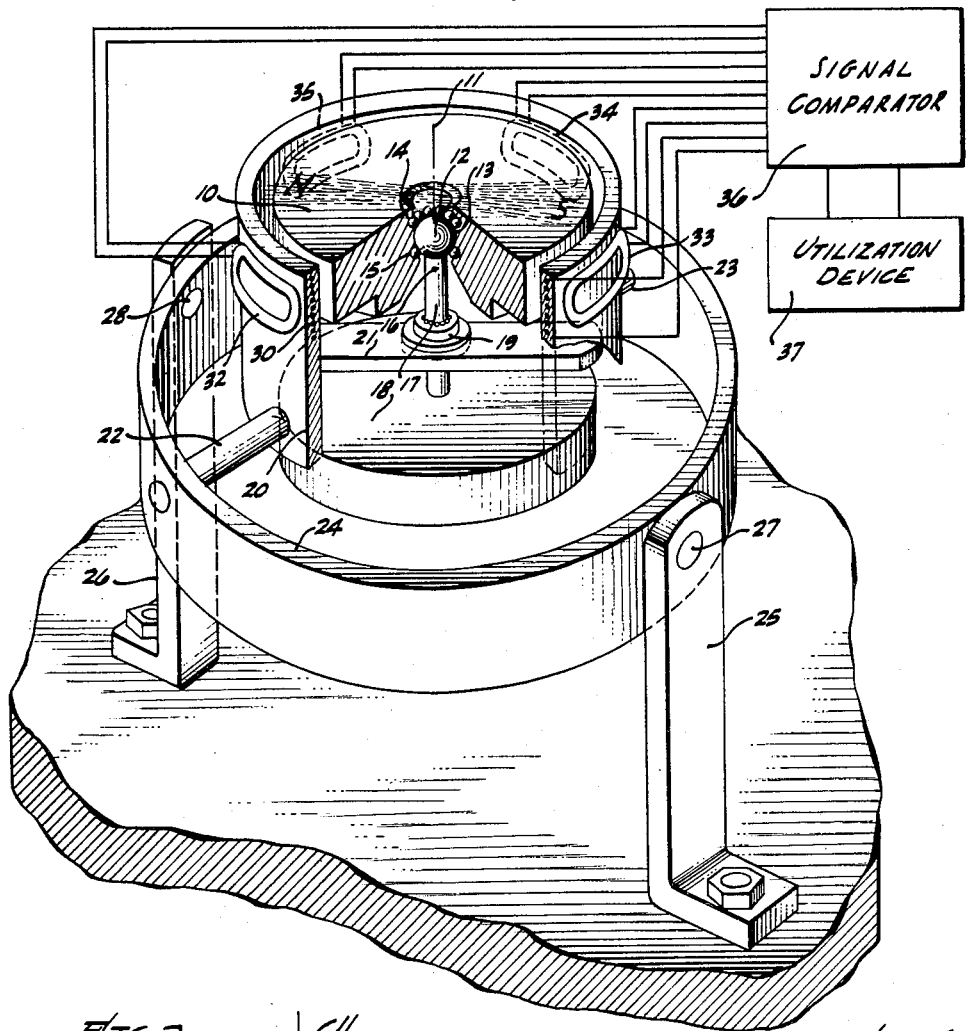

Aug. 23, 1960 D. D. WILLIAMS 2,949,780
INTEGRATING ACCELEROMETER
Filed July 23, 1957

INVENTOR.
DONALD D. WILLIAMS,
BY Gordon R. Sanborn

AGENT.

United States Patent Office 2,949,780
Patented Aug. 23, 1960

2,949,780

INTEGRATING ACCELEROMETER

Donald D. Williams, Los Angeles, Calif., assignor to Hughes Aircraft Company, Culver City, Calif., a corporation of Delaware Filed July 23, 1957, Ser. No. 673,714

1 Claim. (Cl. 73—504)

The present invention relates to an accelerometer and more particularly to an inherently space stabilized singly integrating accelerometer having two mutually perpendicular sensitive axes.

In the prior art the sensing of velocity changes along two mutually perpendicular axes has required two singly integrating accelerometers. Stable platforms have also been required for prior art integrating accelerometer systems to orient the sensitive axes of the accelerometers in the proper directions to sense the desired velocity changes. In addition, if velocity information is obtained by integrating the components of acceleration, many prior art accelerometers have an inherent disadvantage in that additional circuitry is required to perform the integrating function. Prior art singly integrating accelerometers which do not require integrating circuitry, do require other additional circuitry, such as servo amplifiers.

It is therefore an object of the present invention to provide an improved integrating accelerometer.

A further object of the present invention is to provide a space stabilized integrating accelerometer.

Another object of the present invention is to provide a space stabilized singly integrating accelerometer which is sensitive to all accelerations in one plane.

In accordance with the present invention, a first free gyroscopic mass whose center of gravity is on its axis of rotation but noncoincident with its center of suspension serves as the acceleration sensitive element. It can be shown that for such an axially unbalanced gyroscopic mass, or rotor, the rate of precession of the axis of rotation is proportional to the component of applied acceleration which is normal to the axis of rotation. It can be further shown that the total angle of precession is proportional to the integral with respect to time of the applied accelerations normal to the axis of rotation. Hence the angle through which the axis of rotation of the free gyro is deflected with respect to its initial orientation in space is proportional to the total velocity change of the carrying vehicle normal to the axis of the gyro. The direction of the precession is at right angles to the applied acceleration and hence the integrating accelerometer of the present invention inherently provides an integration of all accelerations lying in a plane perpendicular to the axis of rotation.

To provide an initial reference direction with respect to which the amount of deflection of the axis of rotation of the first rotor or gyro is measured, a second gyro so balanced that it does not precess in response to the accelerations being measured, is provided. Although in some cases it may be found advantageous to utilize a three degree of freedom gimbal system for the second gyro, it is possible in many uses of the integrating accelerometer of the present invention to decrease the complexity of the system and use a two degree of freedom gimbal structure for the second gyro. The important requirement is that the gimbal system allow the spin axis, or axis of rotation, of the second gyro to point in any direction.

The axes of rotation of the two rotors are made initially parallel while they are brought up to the desired speed and prior to the time when an integration of the applied acceleration is desired. The first gyro is so mounted that when it is uncaged it is sensitive only to accelerations normal to the axis of rotation of the second gyro and hence to all accelerations in the plane normal to the axis of rotation. The second gyro is so mounted that when it is uncaged it is insensitive to any applied accelerations and hence maintains a fixed spatial reference for measuring the amount of deflection of the axis of rotation of the first gyro.

An indication of the amount of precession of the first gyro is provided through the use of a signal pick-up coil. One advantageous method of obtaining such signal information is to magnetize the rotor of the first gyro in its plane of rotation and then surround the rotor with a signal pick-up coil having its longitudinal axis maintained parallel to the axis of rotation of the second gyro. In this manner a signal will be produced only when the axes of rotation of the two gyros are nonparallel. Phase information which is necessary to indicate the direction of the applied acceleration or velocity change is derived through the use of four pip or phase reference coils positioned about the magnetized rotor of the first gyro. The signals from the pip coils and the signal coil may then be compared by the use of conventional circuitry to provide the required information.

These and other objects of the present invention are clearly set forth in the appended claim. The invention itself, however, both as to its construction and method of operation as well as additional advantages and objects thereof will be more clearly understood from the following description when read in conjunction with the accompanying drawing and in which, Fig. 1 is a perspective view, partially cut away, showing in a simplified manner an integrating accelerometer provided in accordance with the present invention, and Fig. 2 is a cross section of a portion of the integrating accelerometer provided in accordance with the present invention.

Figure 2:
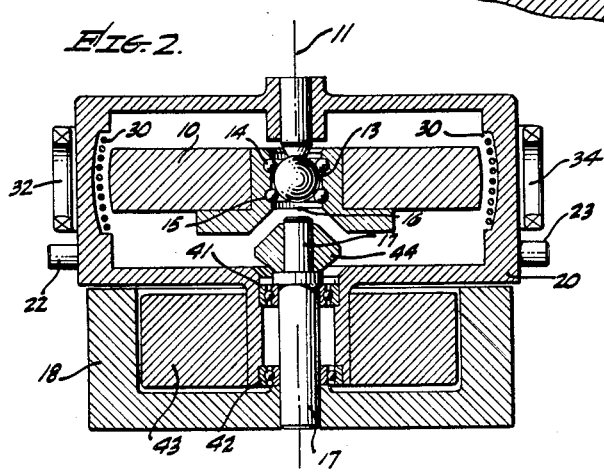

Referring now to the drawing and in particular to Fig. 1, a first gyroscopic mass or rotor 10 having an axis of rotation 11 and a center of rotation 12 is adapted to be rotated about a ball 13 upon which the rotor 10 is mounted through the use of the bearing systems 14 and 15. The rotor 10 is so constructed that its center of mass is noncoincident with its center of rotation 12. That is, the center of mass is displaced to a point 16 which lies upon the axis of rotation 11. The ball joint suspension system for the rotor 10 permits the axis of rotation 11 to precess in response to accelerations applied to the accelerometer normal to the axis of rotation 11.

It can be shown that when an axially unbalanced gyroscopic mass such as the rotor 10 is subjected to accelerations having components normal to its axis of rotation, the amount of precession of the axis of rotation is proportional to the integral of the applied acceleration. The plane of the precession is at right angles to the applied acceleration. All accelerations lying in the plane of the rotor will cause the axis of rotation to be precessed. That the amount of precession is proportional to the integral of applied accelerations can be shown as follows:

$$\bar{\tau} = I\omega \frac{d}{dt}\bar{I}_\psi$$

$$\bar{\tau} = m\bar{a} \times l\bar{I}_\psi$$

$$\frac{d}{dt}\bar{I}_\psi = \frac{m\bar{a} \times l\bar{I}_\psi}{I\omega}$$

$$\Delta \bar{I}_\psi = \frac{ml}{I_\psi}\int \bar{a} \times \bar{I}_\psi dt$$

where:

$\tau$ = torque required to produce an angular velocity of precession
$I$ = moment of inertia about the axis of rotation
$\omega$ = angular velocity of the rotor
$m$ = mass of the rotor
$\bar{a}$ = applied acceleration
$l$ = distance between the center of mass and the center of rotation
$\bar{I}$ = a unit vector in direction of axis of rotation
$\Delta \bar{I}_\psi$ = the change in the unit vector $\bar{I}_\psi$ due to precession It is thus seen that the angle through which the axis of rotation is precessed, which is represented in magnitude and direction by $\Delta \bar{I}$ is proportional to the integral of all accelerations lying in the plane of rotation of the rotor, with the constants of proportionality being easily derived from the physical parameters of the system.

The ball 13 is attached to an axle or shaft 17 which in turn supports a second gyroscopic mass or rotor 18. The shaft 17 and the second rotor 18 are so coupled that the axis of rotation of the second rotor 18 is always coincident with the longitudinal axis of the shaft 17. The gyroscopic action of the second rotor 18 therefore serves to maintatin the longitudinal axis of the axle 17 as a fixed spatial reference axis. The second rotor 18 is mounted in a gimbal system which includes an inner gimbal ring or frame 20 constructed from a material having low permeability and which serves to support the shaft 17 by means of a supporting member 21. The supporting member 21 is rigidly attached to the inner gimbal frame 20, and a bearing system 19 serves to permit rotation of the shaft 17 within the supporting member 21.

The inner gimbal frame 20 is supported by a first pair of journals or trunnions 22 and 23 which are in turn supported by an outer gimbal ring or frame 24. A pair of supporting arms 25 and 26 support the outer gimbal ring 24 by means of a second pair of journals or trunnions 27 and 28. The second set of trunnions 27 and 28 lie in the same plane as the first set of trunnions 22 and 23 and are at right angles to the first set. The supporting arms 25 and 26 are attached to the vehicle carrying the integrating accelerometer. Each of the trunnions is mounted in a bearing system in a manner which is conventional in the art of gimbal systems, and therefore the bearings are not shown.

As the second rotor 18 rotates it serves to maintain the shaft 17 in a fixed orientation in space and nonsensitive to accelerations applied in the plane of rotation of the rotor 18. Since the supporting member 21 maintains the shaft 17 and the inner gimbal ring 20 in fixed space relationship, the inner gimbal ring 20 is also space stabilized by the rotor 18.

Many systems are of course possible for indicating the amount of precession of the axis of rotation 11, but one method which has been found advantageous is to have the first rotor 10 magnetized in its plane of rotation as indicated by the letters "N" and "S." A signal pick-up coil 30 wound within the inner gimbal frame 20 then serves to provide an output signal as the rotor rotates if the plane of rotation of the first rotor 10 is not parallel with the plane of rotation of the second rotor 18. That is, the longitudinal axis of the signal coil 30 is maintained parallel to the axis of rotation of the rotor 18, and therefore there will be no electromotive force induced in signal coil 30 when the magnetized rotor 10 is rotating in a plane perpendicular to the shaft 17. When the rotor 10 is precessed due to applied accelerations, a signal will be produced in the signal coil 30. The signal thus generated is proportional to the amount of precession of the first rotor 10 with respect to the axis of rotation of the second rotor 18.

In order to determine the direction of the velocity change measured by the precession of the first rotor 10, four phase or pip coils 32, 33, 34, and 35 are maintained in fixed space relationship to the inner gimbal ring 20. The longitudinal axis of each phase reference coil is perpendicular to the axis of rotation 11, and hence the lines of flux from the magnetized rotor 10 cut the coils as the rotor rotates, producing an output signal.

The output signals from the phase reference or pip coils 32, 33, 34, and 35 and the signal from the signal pick up coil 30 are compared by a signal comparator 36. The information thus derived from comparing the signals of the pip coils and the signal from the signal pick-up coil 30 can then be used by any suitable utilization device shown in block diagram form as a utilization device 37.

In Fig. 2 there is shown a cross section of the inner gimbal frame and the parts contained therein to illustrate with more particularity a preferred method of constructing the integrating accelerometer of the present invention. It is to be noted, however, that the construction of the elements shown in Fig. 2 differs from the schematic representation in Fig. 1.

Referring now to Fig. 2 of the drawing, those parts which correspond to like elements in Fig. 1 bear the same reference numeral. The inner gimbal ring 20 having the two trunnions 22 and 23 attached thereto serves as the basic reference frame and hence supports the ball 13 about which the first rotor 10 is mounted. The second rotor 18 is rigidly attached to the axle or shaft 17, and the inner gimbal frame 20 is coupled with the axle 17 by a pair of bearings 41 and 42 in a manner such that only rotational motion is permitted between the gimbal frame 20 and the axle 17. Hence the gimbal frame 20 and the ball 13 are in fixed space relationship at all times to the axle 17 which is the axis of rotation of the rotor 18.

Various methods of driving the rotor 18 could be utilized, such as for example an electric motor or air turbine drive. For purpose of illustration an electric motor is shown in Fig. 2 in block form, with a stator 43 being rigidly attached to the inner gimbal frame 20 and thus providing the driving force for the rotor 18 which is the electric rotor for the stator 43.

The rotor 10 can likewise be driven in any one of a number of different ways but one method which has been found advantageous includes the use of a clutch assembly 44 which is shown in the uncaged position. By means of any suitable system such as a spring device the clutch assembly 44 is placed in contact with the acceleration sensitive rotor 10 to provide coupling between the driving motor and the rotor 10. This also serves to align the axis of rotation of the first and second rotors during the time when the acceleration sensitive rotor is being brought to the desired speed and prior to the time when an integration of the applied accelerations is desired.

When the clutch assembly 44 is retracted the first rotor 10 is then free to precess in response to applied accelerations, and as set forth above, the second rotor 18 maintains the inner gimbal frame 20 nonsensitive to the applied accelerations. Thus the magnetic field of the rotating rotor 10 will produce a signal in the signal winding 30 to provide an indication of the total amount of precession of the axis of rotation 11. The electrical signal thus produced in the signal winding 30 is proportional to the deflection of the axis of rotation 11 from the axis of rotation of the reference gyro 18. This signal is then compared with the signals from the phase reference coils by means of conventional circuitry to yield the components of velocity change along the axes determined by the space stabilized inner gimbal frame.

There has thus been disclosed a space stabilized integrating accelerometer which is sensitive to accelerations lying within a given plane and which performs the integrating function without the use of complex circuitry. Since the mechanical arrangement of the various parts may be changed for any specific purpose, it is to be expressly understood that the embodiments shown in the drawing are included only for purpose of illustration.

What is claimed is:

An integrating accelerometer comprising in combination: a first set of trunnions, a first gimbal frame rotatably supported by said trunnions; a second gimbal frame; a second set of trunnions perpendicular to said first set interconnecting said first and second gimbal frames and permitting rotation of said second frame with respect to said first frame; a first rotor supported by said second frame and adapted to provide a spatial reference axis; a second rotor including a magnetic source and having an axis of rotation, a center of rotation, and a center of mass; said center of mass lying upon said axis of rotation and displaced from said center of rotation; mounting means pivotably supporting said second rotor and coupled with said second frame; first driving means coupled with said second frame; second driving means coupled with each of said rotors and adapted to selectively align said axis of rotation and said reference axis; a first signal coil disposed about said second rotor for providing an electrical signal representative of the displacement of said axis of rotation with respect to said reference axis and a plurality of phase reference signal windings disposed about said second rotor.

References Cited in the file of this patent
UNITED STATES PATENTS

| | | |
|---|---|---|
| 1,692,412 | Koenig | Nov. 20, 1928 |
| 1,932,210 | Glitscher | Oct. 24, 1933 |
| 1,954,998 | Hoffman | Apr. 17, 1934 |
| 2,154,678 | Hawthorne et al. | Apr. 18, 1939 |
| 2,519,422 | Agins | Aug. 22, 1950 |
| 2,622,865 | Sundt | Dec. 23, 1952 |
| 2,815,584 | Watson | Dec. 10, 1957 |